US 8,857,778 B2

(12) United States Patent
Nonomiya

(10) Patent No.: US 8,857,778 B2
(45) Date of Patent: Oct. 14, 2014

(54) SLIDE STRUCTURE OF SEAT FOR VEHICLE

(75) Inventor: Masaaki Nonomiya, Yokohama (JP)

(73) Assignee: NHK Spring Co., Ltd., Kanazawa-ku, Yokohama-shi (JP)

( * ) Notice: Subject to any disclaimer, the term of this patent is extended or adjusted under 35 U.S.C. 154(b) by 327 days.

(21) Appl. No.: 13/279,574

(22) Filed: Oct. 24, 2011

(65) Prior Publication Data

US 2012/0104218 A1 May 3, 2012

(30) Foreign Application Priority Data

Oct. 28, 2010 (JP) ................................. 2010-242781

(51) Int. Cl.
| | |
|---|---|
| *F16M 13/00* | (2006.01) |
| *B60N 2/02* | (2006.01) |
| *B60N 2/16* | (2006.01) |
| *B60N 2/08* | (2006.01) |
| *B60N 2/42* | (2006.01) |
| *B60N 2/07* | (2006.01) |

(52) U.S. Cl.
CPC .............. *B60N 2/0715* (2013.01); *B60N 2/167* (2013.01); *B60N 2/0843* (2013.01); *B60N 2/0881* (2013.01); *B60N 2/168* (2013.01); *B60N 2/4228* (2013.01); *B60N 2/1615* (2013.01); *B60N 2/0747* (2013.01); *B60N 2/1665* (2013.01); *B60N 2/0825* (2013.01)
USPC ....................................... 248/429; 296/65.05

(58) Field of Classification Search
CPC .. B60N 2/0175; B60N 2/0843; B60N 2/1615; B60N 2/4228; B60N 2/0825; B60N 2/0881; B60N 2/167; B60N 2/0747; B60N 2/1665; B60N 2/168

USPC ............. 248/429, 421, 424; 296/65.05, 65.18
See application file for complete search history.

(56) References Cited

U.S. PATENT DOCUMENTS

| | | | | | |
|---|---|---|---|---|---|
| 3,450,425 | A | * | 6/1969 | Leonhardt | 403/108 |
| 4,516,811 | A | * | 5/1985 | Akiyama et al. | 384/34 |
| 5,575,449 | A | * | 11/1996 | Shinbori et al. | 248/429 |
| 5,871,195 | A | * | 2/1999 | Gauger | 248/419 |
| 5,882,061 | A | * | 3/1999 | Guillouet | 296/65.05 |
| 6,145,914 | A | * | 11/2000 | Downey et al. | 296/65.18 |
| 6,264,158 | B1 | * | 7/2001 | Downey et al. | 248/422 |
| 6,318,696 | B1 | * | 11/2001 | Downey et al. | 248/430 |
| 6,684,718 | B2 | * | 2/2004 | Muraishi | 73/862.474 |
| 8,322,676 | B2 | * | 12/2012 | Nonomiya | 248/429 |
| 2003/0177847 | A1 | * | 9/2003 | Ishida | 73/862.627 |

* cited by examiner

*Primary Examiner* — Anita M King
(74) *Attorney, Agent, or Firm* — Flynn, Thiel, Boutell & Tanis, P.C.

(57) ABSTRACT

A slide structure of a seat for a vehicle positions a cushion seat in the longitudinal direction of the vehicle has a stationary outer rail which extends in the longitudinal direction of the vehicle and a substantially C-shaped cross section, an open portion which is oriented to be inner in the widthwise direction, and is disposed such that its cross section is elongate in the vertical direction, a movable inner rail which extends in the longitudinal direction of the vehicle and fits over the stationary outer rail so as to be slid relative to the stationary outer rail in the longitudinal direction and is fixed on the cushion seat and includes a substantially C-shaped cross section, an open portion of which is oriented to be outer in the widthwise direction, and is disposed in such a way that its side surface is elongate in the vertical direction.

10 Claims, 26 Drawing Sheets

SLIDE STRUCTURE OF SEAT FOR VEHICLE

FIELD OF THE INVENTION

The present invention relates to a slide structure of a seat for a vehicle and, particularly, relates to the slide structure of the seat for the vehicle which is capable of always securing a smooth sliding function, no matter in which position in the longitudinal direction of the vehicle the seat for the vehicle is located.

BACKGROUND OF THE INVENTION

The present inventor proposed in a patent publication 1 a slide structure of a seat for a vehicle including movable and stationary rails, each of which is disposed to be along a longitudinal direction of the vehicle and includes a C-shaped cross-section.

The slide structure comprises a stationary rail which is fixed on a vehicle floor and extends in the longitudinal direction of the vehicle and a movable rail which fits over the stationary rail in the longitudinal direction so as to be slid on the stationary rail in the longitudinal direction, and the movable rail is connected to the cushion seat via a parallelogram link mechanism which functions to adjust the level of the cushion seat. The parallelogram link mechanism comprises front and rear links parallel to each other, the one end of each of which is pinned to the cushion seat and the other end of each of which is pinned to the side surface of the movable rail, so that each of the front and rear links can be rotated about the horizontal direction.

According to the above slide structure, in a case where a position of the cushion seat is to be adjusted, the longitudinal position of the cushion seat fixed to the movable rail can be adjusted by moving the movable rail relative to the stationary rail in the longitudinal direction in a sliding manner, while, on the other hand, the level of the cushion seat can be adjusted by moving the cushion seat relative to the movable rail in the vertical direction.

In particular, the longitudinal and vertical positions of the seat can be adjusted by a simple structure and the weight of the slide structure of the seat for the vehicle can be reduced, due to the fact that each of the movable and stationary rails includes a cross-section which is elongated in the vertical direction, in other words, it extends in the longitudinal direction and includes a side surface portion along the vertical direction.

However, such a slide structure raised the following technical problems, due to the fact that the shear load in the vertical direction is exerted on the movable rail via the front and rear links of the parallelogram link mechanism. That is, a smooth sliding function can be deteriorated in such a way that the movable and stationary rails can worsen to such a degree that they are brought into a locking situation, or a strange sound or a noise is generated upon a forcible sliding action, depending on the positional relationship between the movable and stationary rails.

More specifically, as shown in FIG. 23, in the slide structure of the seat for the vehicle, the downward shear load is exerted on the side surface of the movable rail 418 via the front link 460 and the rear link 462 of the parallelogram link mechanism, due to the weight of the passenger, or, as shown in FIG. 24, in case of a collision of the vehicle, the shear load is exerted on the side surface of the movable rail 418 via the front link 460 and the rear link 462 (upward direction at the front link 460, downward direction at the rear link 462).

On the other hand, in a case where the cushion seat is positioned to be in the most frontward position, the front end of the movable rail 418 protrudes forward from the front end of the stationary rail 416, while, on the other hand, in a case where the cushion seat is positioned to be in the most rearward position, the rear end of the movable rail 418 protrudes rearward from the rear end of the stationary rail 416. In either case, the movable rail 418 is brought into an overhanging situation.

Under such an overhanging situation, as described above, when the shear load is exerted on the side face of the movable rail 418 via the front link 460 and the rear link 462, as shown in an arrow in FIGS. 25 and 26, a torsion moment in which an arm length is defined to be from the shear center of the movable rail 418 to the point where the shear load is exerted on acts on the movable rail 418. In such a case, in accordance with a value of the torsion moment, the smooth slide function between both rails can deteriorate in such a way that the movable rail 418 can be locked against the stationary rail 416, or strange sounds can be generated when the movable rail 418 is forcibly slid relative to the stationary rail 416.

Here, the shear center is defined to be a point where an acting line of a resultant force of a shear stress on a cross-section (its value and its direction correspond to a shear force) never fails to pass through. In general, if a lateral load acting on a beam does not pass through the shear center, not only a deflection but also a torsion can be generated. In particular, resistance to torsion of an open cross-section is by far smaller than that of a closed cross-section, so that the torsion generated on the open cross-section becomes large.

Patent Publication 1: Patent Application No. 2008-297333

SUMMARY OF THE INVENTION

The object of the present invention is to provide a slide structure of a seat for a vehicle which is capable of always securing a smooth sliding function, no matter the position in the longitudinal direction of the vehicle the seat for the vehicle is located.

In order to solve the above technical problems, according to an aspect of the invention, there is provided a slide structure of a seat for a vehicle which positions a cushion seat in the longitudinal direction of the vehicle comprising a stationary outer rail which extends in the longitudinal direction of the vehicle and includes a substantially C-shaped cross-section, an open portion of which is oriented to be inward in the widthwise direction, and is disposed in such a way that its cross-section is elongated in the vertical direction, a movable inner rail which extends in the longitudinal direction of the vehicle and fits over the stationary outer rail so as to be slid relative to the stationary outer rail in the longitudinal direction and is fixed on the cushion seat and includes a substantially C-shaped cross-section, an open portion of which is oriented to be outward in the widthwise direction, and is disposed in such a way that its side surface is elongated in the vertical direction, whereby the movable inner rail fits with the stationary outer rail in such a way that open portions formed by the respective C-shaped cross-sections are opposed to each other, so that in a case where the cushion seat is located to be in the most frontward position, the front end of the movable inner rail protrudes forward from the front end of the stationary outer rail while, in a case where the cushion seat is located to be in the most rearward position, the rear end of the movable inner rail protrudes rearward from the rear end of the stationary outer rail, said slide structure further comprising a parallelogram link mechanism rotatable about a horizontal axis including a front link and a rear link parallel to each other, one end of each of which is pinned to the cushion seat, while the other end of each of which is pinned to the side surface of the movable inner rail, and a means for adjusting the widthwise position which functions to adjust the relative positional relationship in the widthwise direction between the movable inner rail and the front link or the rear link in such a way that the shear load transmitted from the front link or the rear link passes through the shear center situated to be inward in the widthwise direction of the side surface of the movable inner rail.

In the present invention, the torsion generated on the movable rail can be restricted, and thus, the smooth sliding function of the movable rail relative to the stationary rail can be secured by adjusting the positional relationship between a parallelogram link mechanism and the movable rail in the widthwise direction of the vehicle in such a way that the shear load acting on the movable rail with a C-shaped cross-section through a link of the parallelogram link mechanism passes through the shear center of the movable rail utilizing the fact that the shear center never fails to be located at the backside (the side opposite to the one which the C-shaped cross-section is opened) in case of a structure with a C-shaped or U-shaped cross-section.

More specifically, when the movable inner rail is brought into an overhanging situation due to a case where the cushion seat is positioned to be in the most frontward position, so that the front end of the movable inner rail protrudes forward from the front end of the stationary outer rail, or a case where the cushion seat is positioned to be in the most rearward position, so that the rear end of the movable inner rail protrudes rearward from the rear end of the stationary outer rail, by adjusting the relative positional relationship in the widthwise direction between the movable inner rail and the front link or the rear link by a means for adjusting the widthwise position in such a way that the shear load transmitted from the front link or the rear link passes through the shear center located to be at the inward side in the widthwise direction of the side surface portion of the movable inner rail, the generation of the torsional moment on the movable inner rail can be restricted, even if the shear load is exerted on the movable inner rail via the front link or the rear link, whereby the generation of the locking of the slide in the longitudinal direction of the movable inner rail relative to the stationary outer rail can be restricted, so much so that the generation of a strange sound or noise can be prevented when the movable inner rail is forcibly slid relative to the stationary outer rail and, as a result, the smooth slide function can be always secured, no matter in which longitudinal position the movable inner rail is located relative to the stationary outer rail.

In this connection, the above smooth slide function can be always secured only by mounting such a positioning means on the conventional slide structure without a need to modify the conventional slide structure in a big way.

In another embodiment of the present invention, said slide structure further comprises link pins, each of which pins the respective front and rear links to the side surface portion of the movable inner rail, each of the link pins includes a body portion with a non-circular cross-section and a reduced-diameter threaded portion with a circular cross-section on a circumferential surface of which a threaded portion is provided, a shoulder portion is formed between the body portion and the threaded portion, a non-circular opening into which the body portion penetrates is provided on the side surface of the movable inner rail in such a way that the link pin cannot rotate about the axial direction of the link pin, the means for positioning in the widthwise direction includes a protruding flange on the circumferential surface of the link pin, one surface of the protruding flange abuts against the side surface of the movable inner rail and the other surface of the protruding flange opposite to the one surface abuts against the fork lift and the protruding flange includes a predetermined thickness in such a way that a shear load transmitted from the front link or the rear link passes through the shear center of the movable inner rail, and a circular opening into which the body portion can penetrate is provided on the front link or the rear link.

In another embodiment of the present invention, said slide structure further comprises link pins each of which pins the respective front and rear links to the side surface portion of the movable inner rail, each of the link pins includes a body portion with a non-circular cross-section, a flange portion is provided on one end of the body portion and a reduced-diameter threaded portion with a circular cross-section on a circumferential surface of which a threaded portion is provided is provided on the other end of the body portion, a shoulder portion is formed between the body portion and the threaded portion, a non-circular opening into which the body portion penetrates is provided on the side surface of the movable inner rail in such a way that the link pin cannot rotate about the axial direction of the link pin, the means for positioning in the widthwise direction includes a positioning collar including on its peripheral surface a protruding flange, one surface of which abuts against the side surface of the movable inner rail and the other surface opposite to the one surface abuts against the fork lift and which includes a predetermined thickness in such a way that a shear load transmitted from the front link or the rear link passes through the shear center of the movable inner rail, the positioning collar includes a perforated hole with a non-circular cross-section which can fit over the outer peripheral surface of the body portion of the link pin and an outer circumferential surface with a circular cross-section, and a circular opening into which the body portion can penetrate is provided on the front link or the rear link.

In another embodiment of the present invention, the slide structure of the seat for the vehicle further comprises a nut threaded into the threaded portion and a washer including an opening into which the threaded portion can penetrate, whereby one surface of the washer is brought into abutment with the side surface of the front link or the rear link by making the threaded portion penetrate into the washer and screwing the nut, and the front link or the rear link is fixed in the widthwise direction relative to the movable inner rail by pressing the front link or the rear link against the movable inner rail.

In another embodiment of the present invention, the positioning collar includes a fitting portion to be fitted with the non-circular opening of the movable inner rail on the one surface of the protruding flange, and the axial length of the positioning collar is the same as that of the body portion, whereby the end surface of the positioning collar is pressed to be fixed by the washer.

In another embodiment of the present invention, a driving bush is interposed between the protruding flange and the front link or the rear link.

In another embodiment of the present invention, the stationary outer rail includes a stationary side surface oriented to be in the vertical direction, a stationary protruding upper surface protruding inward in the widthwise direction from the upper edge of the stationary side surface, and a stationary protruding lower surface protruding inward in the widthwise direction from the lower edge of the stationary side surface, the movable inner rail includes a movable side surface oriented to be in the vertical direction, a movable protruding upper surface protruding outward in the widthwise direction from the upper edge of the movable side surface, and a movable protruding lower surface protruding outward in the widthwise direction from the lower edge of the movable side surface.

In order to solve the above technical problems, according to an aspect of the invention, there is provided a slide structure of a seat for a vehicle which positions a cushion seat in the longitudinal direction of the vehicle comprising a stationary inner rail which extends in the longitudinal direction of the vehicle and includes a substantially C-shaped cross-section an open portion of which is oriented to be inward in the widthwise direction, and is disposed in such a way that its cross-section is elongated in the vertical direction, a movable outer rail which extends in the longitudinal direction of the vehicle and fits over the stationary inner rail so as to be slid relative to the stationary inner rail in the longitudinal direction and is fixed on the cushion seat and includes a substantially C-shaped cross-section, and is disposed in such a way that its side surface is elongated in the vertical direction, whereby the movable outer rail fits with the stationary inner rail in such a way that open portions formed by the respective C-shaped cross-sections are opposed to each other, so that in a case where the cushion seat is located to be in the most frontward position, the front end of the movable outer rail protrudes forward from the front end of the stationary inner rail while, in a case where the cushion seat is located to be in the most rearward position, the rear end of the movable outer rail protrudes rearward from the rear end of the stationary inner rail, said slide structure further comprises a parallelogram link mechanism rotatable about a horizontal axis including a front link and a rear link parallel to each other, one end of each of which is pinned to the cushion seat, while the other end of each of which is pinned to the side surface of the movable outer rail, and a means for adjusting the widthwise position which functions to adjust the relative positional relationship in the widthwise direction between the movable outer rail and the front link or the rear link in such a way that the shear load transmitted from the front link or the rear link passes through the shear center situated to be outward in the widthwise direction of the side surface of the movable outer rail.

In another embodiment of the present invention, said slide structure further comprises link pins, each of which pins the respective front and rear links to the side surface portion of the movable inner rail, each of the link pins includes a body portion with a non-circular cross-section and a reduced-diameter threaded portion with a circular cross-section on a circumferential surface of which a threaded portion is provided, a shoulder portion is formed between the body portion and the threaded portion, a non-circular opening into which the body portion penetrates is provided on the side surface of the movable inner rail in such a way that the link pin cannot rotate about the axial direction of the link pin, the means for positioning in the widthwise direction includes a protruding flange on the circumferential surface of the link pin, one surface of the protruding flange abuts against the side surface of the movable inner rail and the other surface of the protruding flange opposite to the one surface abuts against the fork lift and the protruding flange includes a predetermined thickness in such a way that a shear load transmitted from the front link or the rear link passes through the shear center of the movable inner rail, and a circular opening into which the body portion can penetrate is provided on the front link or the rear link.

In another embodiment of the present invention, said slide structure further comprises link pins, each of which pins the respective front and rear links to the side surface portion of the movable inner rail, each of the link pins includes a body portion with a non-circular cross-section, a flange portion is provided on one end of the body portion and a reduced-diameter threaded portion with a circular cross-section on a circumferential surface of which a threaded portion is provided is provided on the other end of the body portion, a shoulder portion is formed between the body portion and the threaded portion, a non-circular opening into which the body portion penetrates is provided on the side surface of the movable inner rail in such a way that the link pin cannot rotate about the axial direction of the link pin, the means for positioning in the widthwise direction includes a positioning collar including on its peripheral surface a protruding flange, the one surface of which abuts against the side surface of the movable inner rail and the other surface of which opposite to the one surface abuts against the fork lift and which includes a predetermined thickness in such a way that a shear load transmitted from the front link or the rear link passes through the shear center of the movable inner rail, the positioning collar includes a perforated hole with a non-circular cross-section which can fit over the outer peripheral surface of the body portion of the link pin and an outer circumferential surface with a circular cross-section, and a circular opening into which the body portion can penetrate is provided on the front link or the rear link.

DETAILED DESCRIPTION OF EMBODIMENTS OF THE INVENTION

The first embodiment of the slide structure of the present invention will be described in detail with reference to the drawings as an example.

Figure 1:
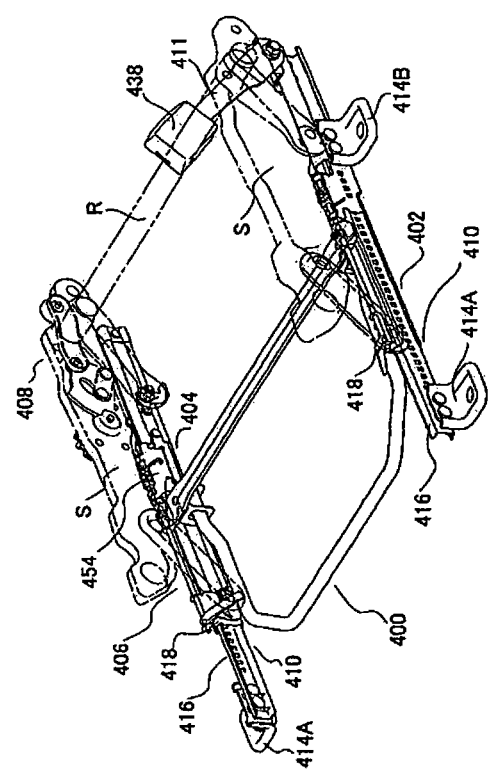
FIG. 1 is a perspective view showing a slide structure of a vehicle seat of the first embodiment of the present invention.

As shown in FIG. 1, a slide structure 400 of the seat for the vehicle generally comprises a mechanism 402 for adjusting the longitudinal position of the seat for the vehicle, a mechanism 404 for positioning the vehicle seat in the longitudinal direction, a mechanism 406 for adjusting the vertical position of the seat for the vehicle, and a mechanism 408 for positioning the vehicle seat in the vertical direction.

The vehicle seat comprises a pair of side frames S each extending in the longitudinal direction of the vehicle, front and rear pipes F, R each connecting the pair of side frames, a seat cushion fixed on the vehicle (not shown), and a seat back (not shown) mounted on the seat cushion via a recliner (not shown) so as to be reclined relative to the seat cushion. Since the slide structure 400 of the seat for the vehicle is provided on the side frame S of the seat cushion, the entire vehicle seat including the seat back can be adjustably positioned by the fact that the longitudinal and vertical position of the seat cushion can be adjusted and positioned.

The mechanism 402 for adjusting the longitudinal position of the seat for the vehicle generally comprises a pair of rail structures 410 spaced apart from each other in the widthwise direction of the vehicle and a retainer 412 (refer to FIG. 4) for moving the rails in the longitudinal direction in a sliding manner.

As shown in FIG. 1, since the slide structure 400 of the seat for the vehicle is configured in a symmetrical manner with respect to a central line in the longitudinal direction except for the fact that a belt bracket 411 including a belt buckle 438 into which a passenger belt fits is provided on one of the pair of rail structures 410, one of the pair of rail structures 410 will be explained and, as to the other thereof, the reference numbers same as those attached to the elements in the one are attached to the same elements, and explanation about the other thereof is omitted instead.

Each of the pair of the rail structures 410 is made of steel and comprises a stationary outer rail 416 fixed on a vehicle floor and extending in the longitudinal direction, and a movable inner rail 418 fixed on a seat cushion C and extending in the longitudinal direction. One end of the stationary outer rail 416 is supported by a leg 414A, while the other end thereof is supported by a leg 414 B. The legs 414A,B are spaced apart from each other in the longitudinal direction and each leg serves as a bracket for mounting the stationary outer rail 416, while the movable inner rail 418 fits over the stationary outer rail 416. In view of a space of the floor on the front side on which the slide structure 400 of the seat for the vehicle is disposed, the length of each of the movable inner rail 418 and the stationary outer rail 416 may be appropriately determined taking into consideration a situation in which the movable inner rail 418 is disposed to be in the most rearward position and the most frontward position of the vehicle relative to the stationary outer rail 416.

Figure 2:
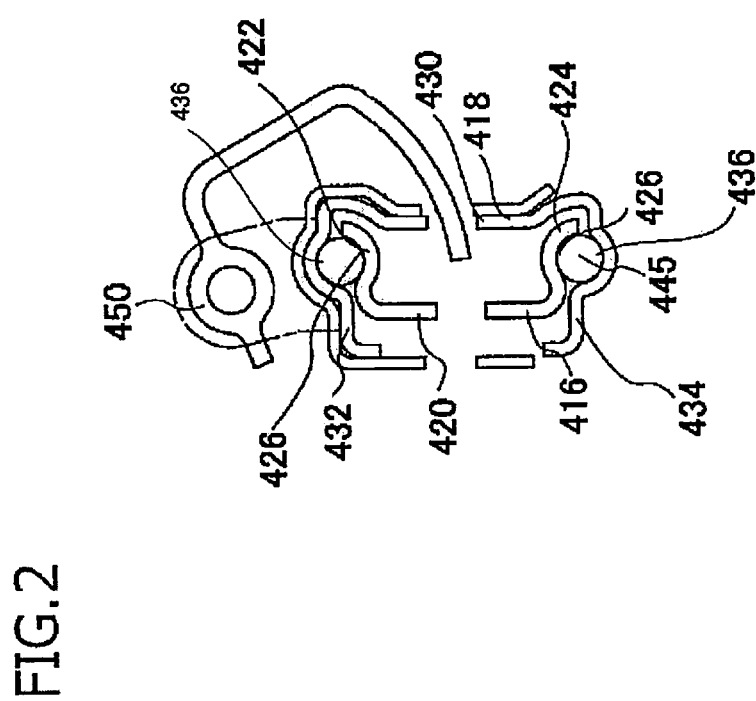
FIG. 2 is a general cross-sectional view showing a situation in which a movable inner rail is disengaged from a stationary outer rail in the slide structure of a vehicle seat of the first embodiment of the present invention.
Figure 3:
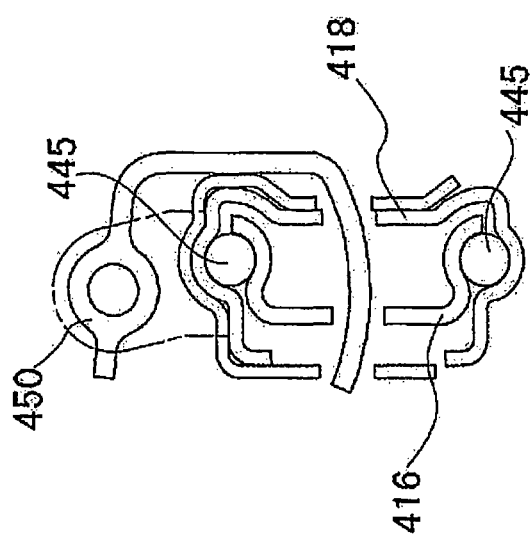
FIG. 3 is a general cross-sectional view showing a situation in which a movable inner rail is engaged by a stationary outer rail in the slide structure of a vehicle seat of the first embodiment of the present invention.

As shown in FIGS. 2 and 3 (in both Figs., the left side in the figure means the outside of the vehicle in the widthwise direction), the stationary outer rail 416 includes a stationary side surface 420 extending in the longitudinal direction along the vertical direction, a first protruding stationary upper surface 422 laterally protruding from one of the side edges of the stationary side surface 420, and a second protruding stationary lower surface 424 laterally protruding from the other side edge of the stationary side surface 420 to form a substantially C-shaped cross-section. Each of the first protruding stationary upper surface 422 and the second protruding stationary lower surface 424 includes at its outer surface a second arcuate cross-sectional groove 426 extending in the longitudinal direction. The second arcuate cross-sectional groove 426 cooperates with a first arcuate cross-sectional groove 436 provided on the movable inner rail 418 (which is explained about below) to form a guide groove for guiding a ball. Accordingly, a shape of the arcuate cross-section of each of the above grooves may be determined in view of the above aspect.

Figure 4:
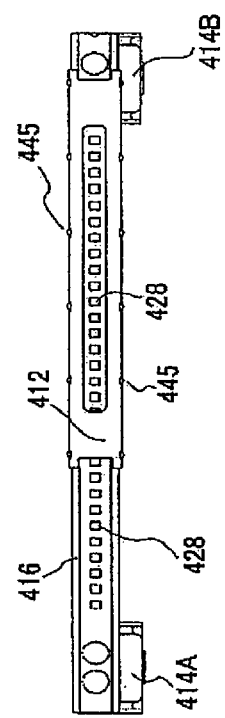
FIG. 4 is a general side view showing a situation in which a retainer is mounted on a stationary outer rail in the slide structure of a vehicle seat of the first embodiment of the present invention.

As shown in FIG. 4, a plurality of stationary locking holes 428 spaced apart from each other in the longitudinal direction with a predetermined distance are provided on the stationary outer rail 416. The number of the stationary locking holes 428 may be appropriately determined in view of a range in which the movable inner rail 418 moves in the longitudinal direction relative to the stationary outer rail 416.

On the other hand, as shown in FIGS. 2 and 3, the movable inner rail 418 fits over the stationary outer rail 416 with opening portions formed by the respective C-shaped cross-sections facing each other. The movable inner rail 418 includes a movable side surface 430 extending in the longitudinal direction along the vertical direction, a first protruding stationary upper surface 432 laterally protruding from one of the side edges of the movable side surface 430, and a second protruding stationary lower surface 434 laterally protruding from the other side edge of the movable side surface 430 to form a substantially C-shaped cross-section. Each of the first protruding movable upper surface 432 and the second protruding movable lower surface 434 includes at its inner surface the first arcuate cross-sectional groove 436 extending in the longitudinal direction.

Figure 5:
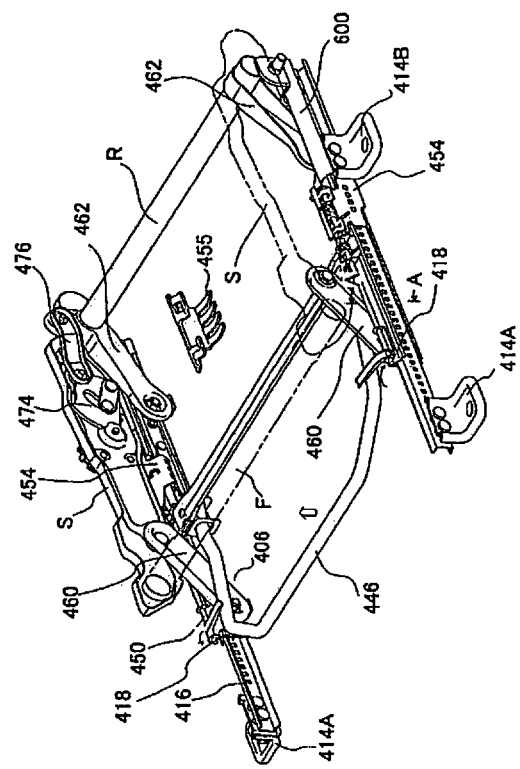
FIG. 5 is a view showing a situation in which the longitudinal position of the seat for the vehicle is adjusted by the slide structure of a vehicle seat of the first embodiment of the present invention.
Figure 8:
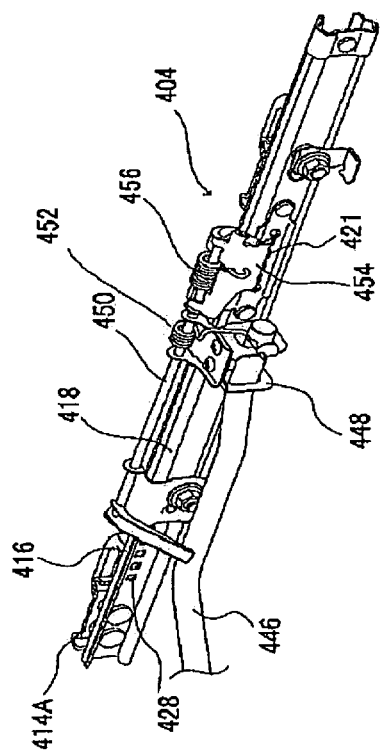
FIG. 8 is a partial enlarged view showing one of the rails in the slide structure of a vehicle seat of the first embodiment of the present invention.

As shown in FIG. 5, the movable inner rail 418 is fixed on the corresponding side frame S of the seat cushion through a parallel link mechanism of the mechanism 406 for adjusting the vertical position of the seat cushion described below. In the pair of the rail structures 401, as described above, the belt buckle 438 is fixed on the rear side end portion of one of the movable inner rail 418 (refer to FIG. 1). A plurality of movable locking holes 421(refer to FIG. 8) are provided on the movable inner rail 418 with being spaced apart from each other with the same distance as that of the adjacent stationary locking holes 428 in the longitudinal direction. In FIG. 8, four movable locking holes 421 are provided in view of the relationship between a locking plate 454 (described later) and the movable locking holes 421. However, the number of the movable locking holes 421 is not limited to four, but less than four may be adopted so long as the movable inner rail 418 can be reliably locked against the stationary outer rail 416.

Figure 6:
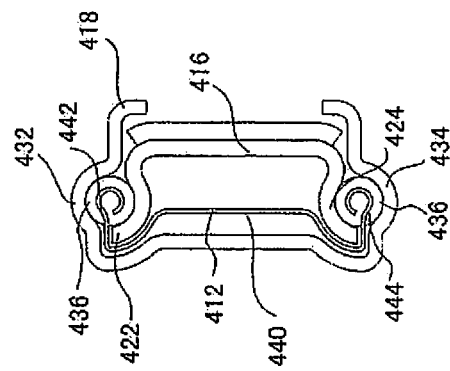
FIG. 6 is a cross-sectional view taken along a line A-A in FIG. 5.
Figure 7:
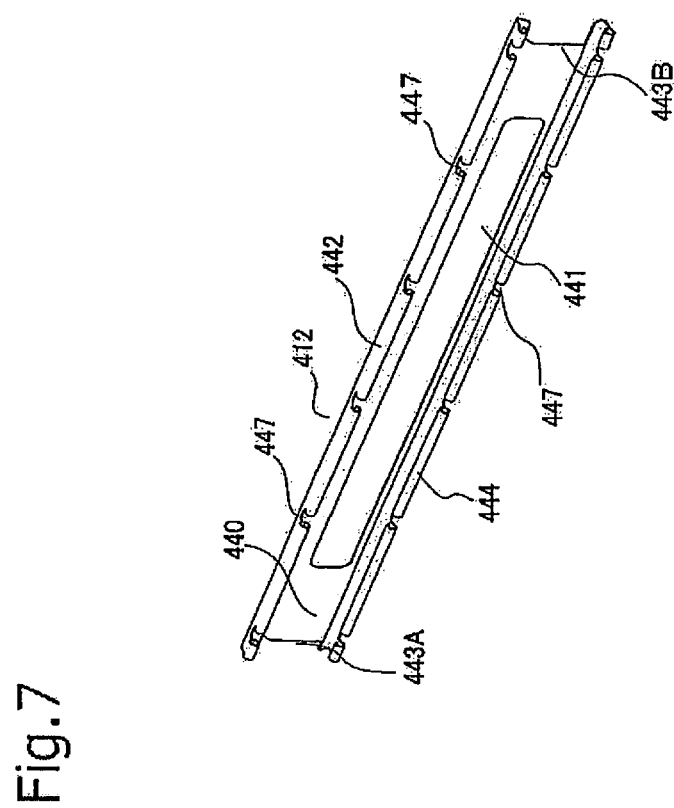
FIG. 7 is a perspective view showing a retainer in the slide structure of a vehicle seat of the first embodiment of the present invention.

As to a retainer 412, as shown in FIG. 6 (in this figure, the left side indicates the inside of the vehicle in the width wise direction), the retainer 412 extending in the longitudinal direction is provided between the stationary outer rail 416 and the movable inner rail 418. As shown in FIG. 7, the retainer 412 includes a retainer side surface 440 extending in the longitudinal direction along the vertical direction, a plurality of first protruding stationary upper surfaces 442 which are spaced apart from each other in the longitudinal direction and each of which laterally protrudes from one of the side edges of the retainer side surface 440, and a plurality of second protruding stationary lower surfaces 444 which are spaced apart from each other in the longitudinal direction and each of which laterally protrudes from the other side edge of the retainer side surface 440. More specifically, as shown in FIG. 6, a concave portion which extends in the longitudinal direction and is dented toward an inner surface of the stationary outer rail 416 is provided on the retainer side surface 440, which forms an M-shaped cross-section. This allows for the retainer 412 to move in the longitudinal direction while it is guided by the first protruding stationary upper surface 422 and the second protruding stationary lower surface 424 of the stationary outer rail 416, and yet its side surface is kept disengaged from the movable inner rail 418.

As shown in FIG. 7, an elongated opening 441 extending in the longitudinal direction is provided on the retainer side surface 440 of the retainer 412. The elongated opening 441 includes a front end edge 443A and a rear end edge 443B. The longitudinal length of the elongated opening 441 may be appropriately determined in view of the fact that the strength of the retainer 412 is sufficiently secured and yet the weight thereof is decreased.

As shown in FIG. 6, the retainer 412 is positioned relative to the stationary outer rail 416 with the opening portions formed by the respective C-shaped cross-sections facing each other and the plurality of first retainer protruding upper surfaces 442 being interposed between the first protruding movable upper surface 432 and the first protruding stationary upper surface 422, while the plurality of second retainer protruding lower surfaces 444 being interposed between the second protruding movable lower surface 434 and the second protruding stationary lower surface 424.

As shown in FIG. 7, each of the plurality of the first retainer protruding upper surfaces 442 and the plurality of second retainer protruding lower surfaces 444 includes perforated holes 447 each retaining a ball 445. This causes the ball 445 to roll between the first protruding movable upper surface 432 and the first protruding stationary upper surface 422 and between the second protruding movable lower surface 434 and the second protruding stationary lower surface 424, whereby the movable inner rail 418 along with the retainer 412 can be moved in the longitudinal direction relative to the stationary outer rail 416.

As stated above, the movable side surface 430, the stationary side surface 420 and the retainer side surface 440 are all oriented in the vertical direction, whereby each of the movable outer rail 416 and the stationary inner rail 418 is disposed so as to form an elongated cross-section in the vertical direction. This allows for the section modulus of each of the two rails to be effectively secured with respect to a bending moment about a neutral line in the widthwise direction in its vertical cross-section, as compared with the rails with the elongated cross-section in the horizontal direction.

Next, as shown in FIGS. 5 and 8, the mechanism 404 for positioning the seat cushion in the longitudinal direction generally comprises an actuation lever 446, a bracket 448 for supporting the actuation lever 446, a release rod 450, a spring 452 for locking the actuation lever, a locking plate 454 including locking teeth 455 (refer to FIG. 5), and a return spring 456 for the locking plate. The number of the locking teeth 455 is set to be the same as that of the movable locking holes 421 and the distance between the adjacent teeth is set to be the same as that of the adjacent movable locking holes 421, whereby the locking teeth 455 can penetrate into the movable locking holes 421 and the stationary locking holes 428.

The release rod 450 is rotated about the longitudinal direction of the rail toward the outside of the rail (a direction an arrow indicates in FIG. 5) by raising the actuation lever 446 against the biasing force generated by the spring 452 for locking the actuation lever, whereby the locking plate 454 mounted on the release rod 450 is rotated against the biasing force generated by the return spring 456 for the locking plate from a locking position to a lock releasing position. This allows for the locking teeth 455 having been penetrating into the movable locking holes 421 and the stationary locking holes 428 to disengage from both holes, whereby the movable inner rail 418 can freely move in the longitudinal direction relative to the stationary outer rail 416 (refer to FIG. 2).

After the movable inner rail 418 is moved in the longitudinal direction to a target position, the actuation lever 446 having been raised is released at this position. This causes the actuation lever 446 to be lowered by the spring 452 for locking the actuation lever, whereby the release rod 450 is rotated toward the inside of the rail (contrary to the direction an arrow indicates in FIG. 5), while the locking plate 454 is rotated from the locking releasing position to the locking position by the biasing force generated by the return spring 456 for the locking plate. This causes the seat cushion to be positioned on a new position in the longitudinal direction (refer to FIG. 3).

Figure 9:
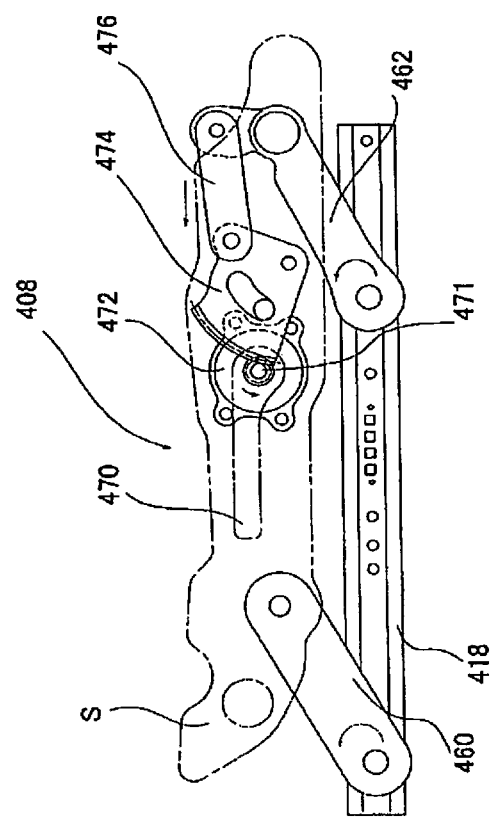
FIG. 9 is a general side view showing a general structure of the mechanism for adjusting the height of the vehicle in the slide structure of a vehicle seat of the first embodiment of the present invention.
Figure 10:
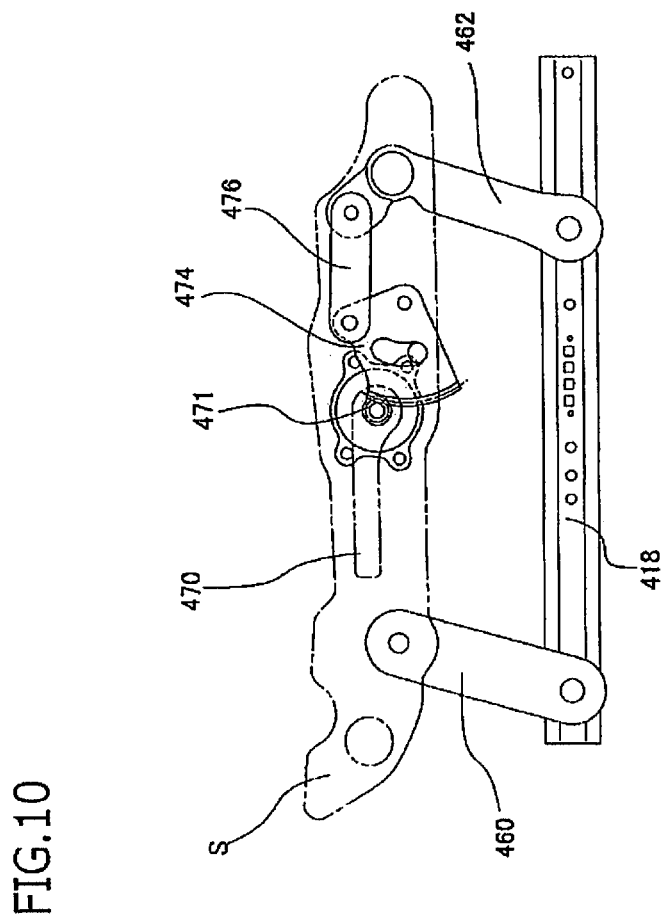
FIG. 10 is a view similar to FIG. 9 showing a situation in which the seat cushion is raised by the mechanism for adjusting the height of the vehicle in the slide structure of a vehicle seat of the first embodiment of the present invention.

As shown in FIGS. 9 and 10, the mechanism 406 for adjusting the level of the seat for the vehicle comprises a front link 460 and a rear link 462 which constitute a parallelogram link mechanism which pins the movable inner rail 418 and the corresponding side frame S of the cushion seat. The level of the side frame can be automatically adjusted by adjusting the angle of the front link 460 or the rear link 462 relative to the movable inner rail 418.

Figure 11:
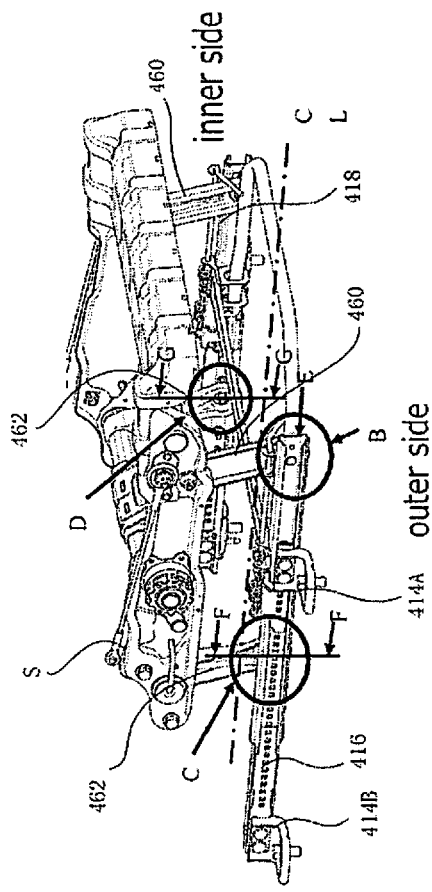
FIG. 11 is a partial perspective view showing the slide structure of a vehicle seat of the first embodiment of the present invention.

As shown in FIG. 11, each of the front link 460 and the rear link 462 is pinned on the side surface portion of the movable inner rail 418 via the link pin 50 so as to rotate about the widthwise direction within the vertical plane.

More specifically, the parallelogram link mechanism is connected to the four points of the movable inner rail 418 (front and rear portions in the longitudinal direction of the movable inner rail 418 at the inner side, and front and rear portions in the longitudinal direction of the movable inner rail 418 at the outer side), and the structures around the link pin of the front and the rear portion at the outer side, and the front portion at the inner side are different from that of the rear portion at the inner side, since the belt anchor is provided on the rear portion of the movable inner rail 418 at the inner side, as described above.

Firstly, the structures around the link pin of the front and the rear portion of the movable inner rail 418 at the outer side, and the front portion thereof at the inner side are explained.

Figure 12:
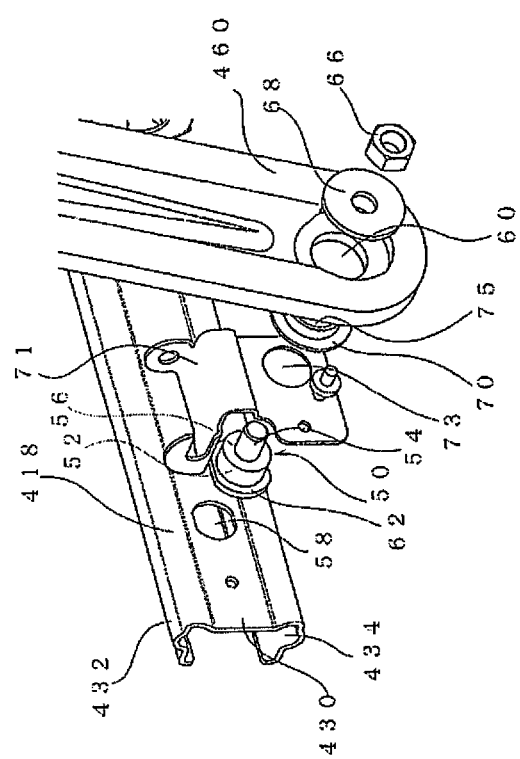
FIG. 12 is a view showing elements around B portion of FIG. 11.
Figure 13:
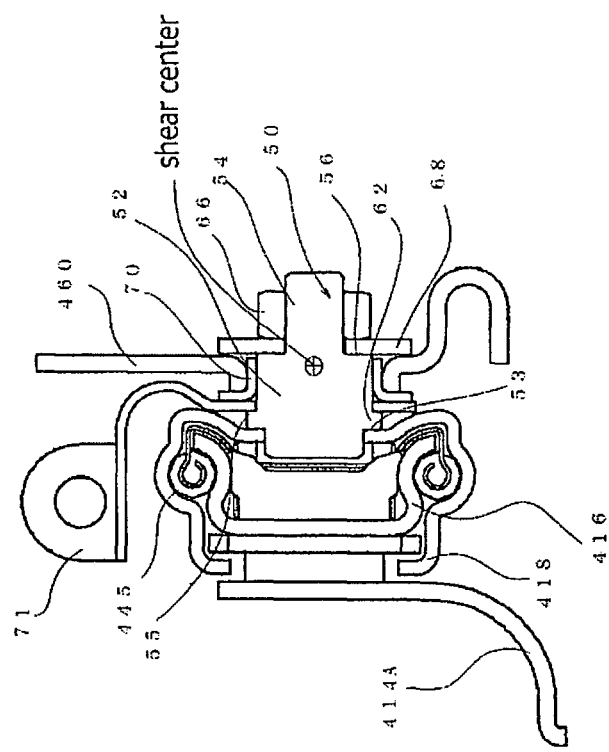
FIG. 13 is a view seen from E-direction in FIG. 11.

In FIGS. 12 and 13 (the left side indicates the outer widthwise side in these Figs.) showing the front link 460 at the outer side, the link pin 50 includes a body portion 52 with a non-circular cross-section and a reduced-diameter threaded portion 54 with a circular cross-section including a threaded portion on its circumferential surface. A shoulder portion 56 is formed between the body portion 52 and the threaded portion 54, and a non-circular opening 58 into which the body portion 52 of the link pin 50 can penetrate is provided on the movable side surface 430 of the movable inner rail 418 in such a way that the link pin 50 cannot rotate about the axial direction of the link pin 50. The non-circular opening 58 is shaped to be oval, for instance. The tip end portion of the body portion 52 of the link pin 50 is fitted into the non-circular opening 58, and welded thereto.

On the other hand, a circular opening 60 into which the body portion 52 can penetrate is provided on the front link 460.

Here, the means for adjusting the widthwise position which is the technical feature of the present invention is now described. Based on the fact that, in a longitudinal extending structure with a C-shaped, or a U-shaped cross-section, the shear center thereof never fails to be located at the back side (the side opposite to the side where the cross-section is open), the means for adjusting the widthwise position functions to adjust the relative positional relationship in the widthwise direction between the movable inner rail 418 and the front link 460 in such a way that the shear load transmitted from the front link 460 can pass through the shear center which is situated to be inside of the movable side surface 430 of the movable inner rail 418 in the widthwise direction.

More specifically, explaining the relationship between the height of the movable side surface 430 of the movable inner rail 418, the protruding width of the first protruding movable upper surface 432 or the second protruding movable lower surface 434 and the position of the shear center, under the condition that the protruding width is constant, the higher the height of the movable surface 430 becomes, the closer the shear center becomes to the movable side surface 430, while, on the other hand, under the condition that the height of the movable side surface 430 is constant, the wider the width of the protruding width becomes, the farther the shear center becomes from the movable side surface 430.

The height of the movable side surface 430 of the movable inner rail 418 is mainly determined in such a way that the movable inner rail 418 can withstand the inertia force in the rear direction which acts on the passenger, in a case where the vehicle is collided with from the rear, while, on the other hand, the protruding width is determined in such a way that the movable inner rail 418 can withstand the force in the lateral direction which acts on the passenger from the arm rest of the door, in a case where the vehicle is collided with from the side. Since, the larger the height of the movable side surface 430 or the protruding width becomes, the bigger the section modulus about the widthwise direction becomes, the shape of the C-shaped cross-section is determined, in accordance with a design specification in which types of collisions are taken into consideration, which influences on the position of the shear center. However, at any rate, the shear center never fails to be located to be at the backside (the side opposite to the side where the cross-section is open).

The means for adjusting the widthwise position includes a protruding flange portion 62 on the peripheral surface of the link pin 50. In the protruding flange portion 62, one surface 53 abuts against the movable side surface 430 of the movable inner rail 418, while the other surface 55 opposite to the one surface 53 abuts against the side surface of the front link 460, and the protruding flange portion 62 includes a predetermined thickness in such a way that the shear load transmitted from the front link 460 passes through the shear center of the movable inner rail 418.

As shown in FIG. 13, this causes the relative positional relationship between the front link 460 and the movable inner rail 418 to be adjusted by adjusting the thickness of the protruding flange portion 62, whereby the shear load transmitted from the front link 460 can pass through the shear center of the movable inner rail 418 and, as a result, the generation of the torsional moment, the arm length of which is defined to be between the shear center and the line of action of the shear load, can be restricted, so that the smooth sliding function between the movable inner rail 418 and the stationary outer rail 416 can be secured.

A release rod holder 71 and a driving bush 70 are interposed between the protruding flange portion 62 and the front link 460, so that the protruding flange portion 62 is adapted to engage the front link 460 in an indirect manner. The driving bush 70 is provided in order to reduce the slide resistance generated while the front link 460 is rotated about the axial direction of the link pin 50 within the vertical plane, and includes an opening 75 into which the link pin 50 penetrates, while, on the other hand, the released rod holder 71 functions to support the release rod 450 which releases the locking condition of the movable inner rail 418 relative to the stationary outer rail 416, and also includes an opening 73 into which the link pin 50 penetrates.

In this connection, in the conventional parallelogram link mechanism, in a case where the sliding action of the movable inner rail 41 relative to the stationary outer rail 416 in the longitudinal direction is locked, or the strange sound or the noise is generated upon the forcible sliding, due to the generation of the above torsional moment, the smooth sliding function can be recovered without a need to renovate the parallelogram link mechanism in a big way simply by replacing the conventional link pin 50 with the link pin 50 including on its peripheral surface the protruding flange portion 62 with a predetermined thickness.

The threaded portion 54 includes a nut 66 which can be threaded into the threaded portion 54 and a washer 68 which includes an opening into which the threaded portion 54 can penetrate. The front link 460 can be pressed against the movable inner rail 418 by screwing the nut 66 into the threaded portion 54 via the washer 68 in such a way that the one face of the washer 68 abuts against the side surface of the front link 460. This causes the front link 460 to be fixed on the movable inner rail 418 in the widthwise direction.

Figure 14:
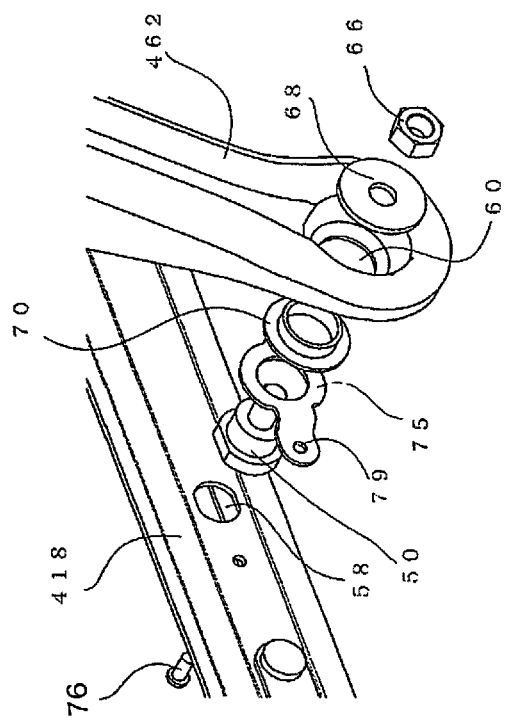
FIG. 14 is a view showing elements around C portion of FIG. 11.
Figure 15:
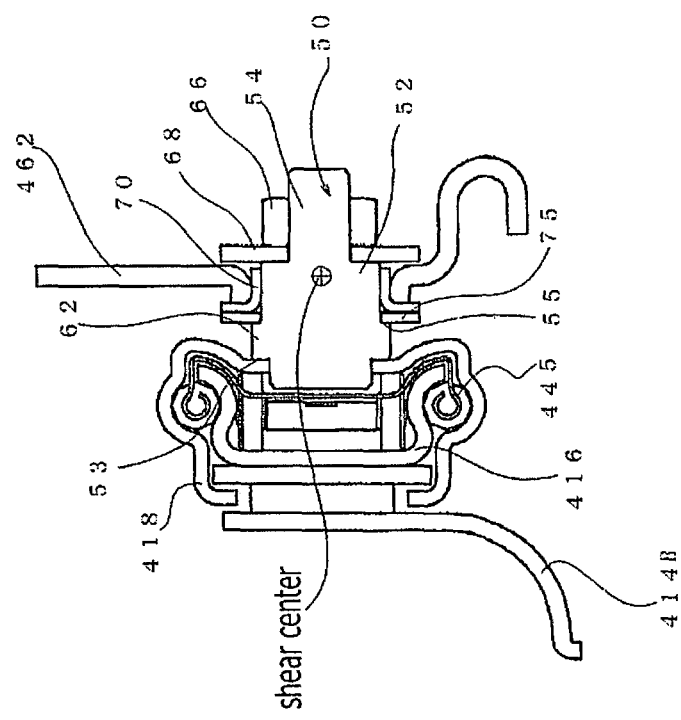
FIG. 15 is a cross-sectional view taken along a line F-F in FIG. 11.

The above structure is the same as that of the front link at the inner side. With respect to the structure around the rear link 462 at the outer side, as shown in FIGS. 14 and 15 (the left side indicates the outer widthwise side in these Figs.), since the structure around the rear link 462 at the outer side is the same as that around the front link 460 at the outer side except for the fact that a link holder 75, instead of the release rod holder 450 is provided on the position of the release rod holder 450 and that the link holder 75 is fixed to the movable inner rail 418 via a rivet 76, the explanation about the same elements in the structure around the rear link 462 at the outer side as those in the structure around the front link 460 at the outer side is omitted by attaching the same reference numbers thereto instead.

On the other hand, with respect to the structure around the rear link 462 at the inner side, means for adjusting the widthwise position different from that of the rear link 462 at the outer side is adopted, since the reinforcing bracket 51 needs to cover the movable inner rail 418 due to the provision of the belt anchor.

Figure 16:
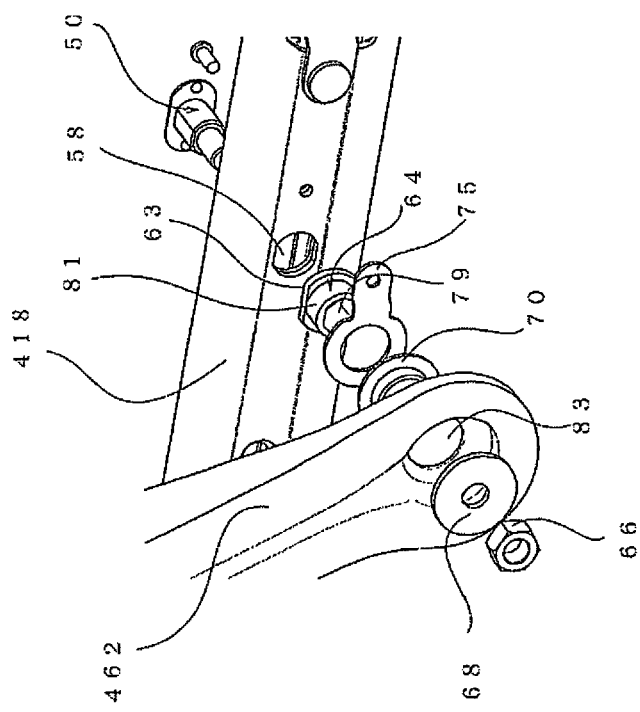
FIG. 16 is a view showing elements around D portion of FIG. 11.
Figure 17:
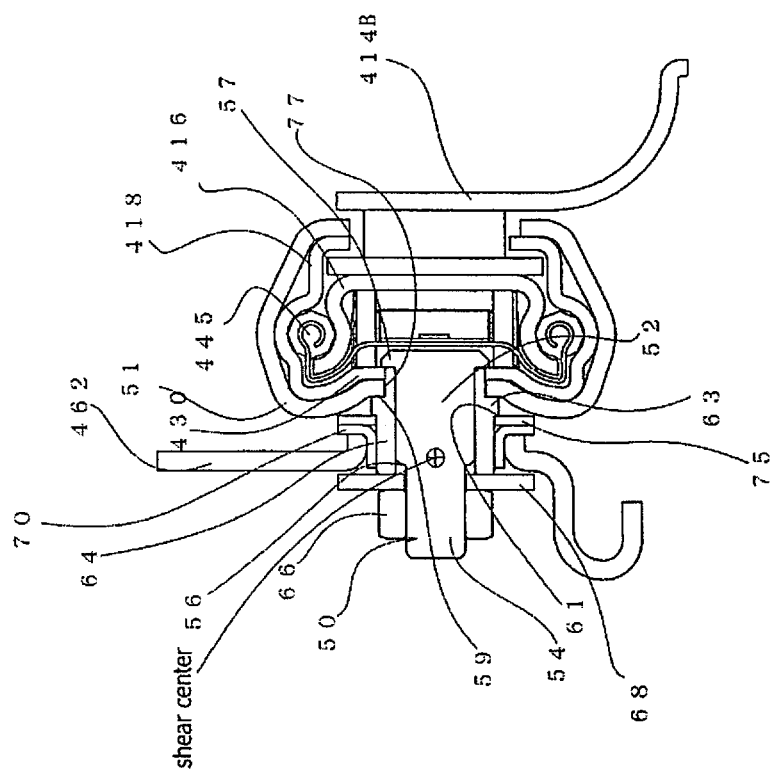
FIG. 17 is a cross-sectional view taken along a line G-G in FIG. 11.

More specifically, as shown in FIGS. 16 and 17 (the left side indicates the inner side in the widthwise direction of the vehicle in each of these Figs.), the link pin 50 includes a body portion 52 with a non-circular cross-section on the end of which a flange portion 57 is provided and on the other end of which a reduced-diameter threaded portion 54 with a circular cross-section including a threaded portion on its circumferential surface is provided. A shoulder portion 56 is provided between the body portion 52 and the reduced-diameter threaded portion 54. The means for adjusting the widthwise position includes a positioning collar 64 including on its peripheral surface a protruding flange 63 with a predetermined thickness set in such a way that a shear load transmitted from the rear link 462 passes through the shear center of the movable inner rail 418 and the one surface 59 of which abuts against the side surface of the movable inner rail 418 and the other surface 61 of which opposite to the one surface 59 abuts against the side surface of the rear link 462.

The positioning collar 64 includes on the one surface of the protruding flange 63 a fitting portion 77 which can fit into a non-circular opening 58 of the movable inner rail 418. The axial length of the positioning collar 64 is substantially the same as that of the body portion 52 of the link pin 50. The end surface of the positioning collar 64 is pressed, and thus, fixed by a washer 68, so that the positioning collar 64 is welded, and thus fixed to the non-circular opening 58 of the movable inner rail 418, whereby the link pin 50 is fixed to the movable inner rail 418 via the positioning collar 64.

The positioning collar 64 includes a perforated hole 79 with a non-circular cross-section which can fit over the outer peripheral surface of the body portion 52 of the link pin 50 and an outer peripheral surface 81 with a circular cross-section, and a circular opening 83 into which the positioning collar 64 can fit is provided on the rear link 462.

In this connection, a link holder 75 and a driving bush 70 are interposed between the protruding flange portion 63 and the rear link 462, like the structure around the rear link 462 at the outer side, so that the protruding flange 63 engages the rear link 462 in an indirect manner, while an auxiliary bracket 51 covering the movable inner rail 418 is interposed between the protruding flange portion 63 and the movable inner rail 418, so that the 35 protruding flange 63 also engages the movable side surface 430 of the movable inner rail 418 in an indirect manner.

As shown in FIG. 17, this causes the positional relationship in the widthwise direction between the rear link 462 and the movable inner rail 418 to be adjusted by adjusting the thickness of the protruding flange portion 63, whereby the shear load transmitted through the rear link 462 passes through the shear center of the movable inner rail 418, and as a result, the generation of the torsional moment, an arm length of which is defined to be between the shear center and the line of action of the shear load, can be restricted, so that the smooth sliding function between the movable inner rail 418 and the stationary outer rail 416 can be secured.

As shown in FIGS. 9 and 10, with respect to the mechanism 408 for positioning the vehicle seat in the vertical direction, an actuation lever 470, a pumping brake unit 472 including a pinion gear 471, a sector gear 474, and a connecting bracket 476 are provided on the side of the side frame S. Since the mechanism 408 for positioning the vehicle seat in the vertical direction is the conventional type, the explanation thereabout in detail is omitted. By swinging upwardly the actuation lever 470, the pinion gear 470 provided on the pumping brake unit 472 is rotated, so that the sector gear 474, is rotated in the direction an arrow in FIG. 13 indicates, whereby the connecting bracket 476 is moved in the direction an arrow in FIG. 13 indicates to raise the rear link 462, and thus, the front link 460, and as a result, the height of the side frame S, and thus, the cushion frame is adjusted, while the pinion gear 471 remains not to be rotated even if a downward force acts thereon from the seat cushion side, so that the seat cushion is held to the adjusted height.

An operation of the slide structure 400 of the seat for the vehicle including the above construction will be described below with reference to the drawings.

Firstly, when the longitudinal position of the seat for the vehicle is adjusted, the locking teeth 455 of the locking plate 454 are removed from the movable locking holes 421 of the movable inner rail 418 and the stationary locking holes 428 of the stationary outer rail 416 by raising the actuation lever 446, so that these rails are disengaged from the locking plate 454. As shown in FIG. 2, this causes the movable inner rail 418 to be freely moved in the longitudinal direction relative to the stationary outer rail 416.

Then, the movable inner rail 418 is moved relative to the stationary outer rail 416 in the longitudinal direction to a target position in the longitudinal direction, forwardly, for instance. In such a case, the movable inner rail 418 can be slidably and smoothly moved relative to the stationary outer rail 416 due to the fact that the retainer 412 itself is caused to move in the direction in which the movable inner rail 418 moves by each of the balls 445 rolling between the first protruding stationary upper surface 422 and the first 5 protruding movable upper surface 432 and between the second protruding stationary lower surface 424 and the second protruding movable lower surface 434 being retained in the perforated holes 447 of the first retainer protruding upper surfaces 442 and the second retainer protruding lower surfaces 444.

Then, by lowering the actuation lever 446, as shown in FIG. 3, the movable inner rail 418 having reached the target position can be locked against and thus fixed on the stationary outer rail 416 by making the locking teeth 455 of the locking plate 454 penetrate into the movable locking holes 421 of the movable inner rail 418 and the stationary locking holes 428 of the stationary outer rail 416 corresponding to the target position.

As stated above, according to the above slide structure 400 of the seat for the vehicle, in a case where the longitudinal position of the seat cushion is adjusted, the vehicle seat fixed on the movable inner rail 418 can be positioned at a desired position in the longitudinal direction of the vehicle by moving the movable inner rail 418 relative to the stationary outer rail 416 fixed on the vehicle floor, in the longitudinal direction in a sliding manner, while the vertical position of the seat cushion can be adjusted by moving the seat cushion relative to the movable inner rail 418 by the mechanism for adjusting the vertical position of the seat cushion.

In such a case, the torsion generated on the movable inner rail 418 can be restricted, and thus, the smooth sliding function of the movable inner 418 rail relative to the stationary outer rail 416 can be secured by adjusting the positional relationship between a parallelogram link mechanism and the movable inner rail 418 in the widthwise direction of the vehicle in such a way that the shear load acting on the movable inner rail 418 with a C-shaped cross-section through a link of the parallelogram link mechanism passes through the shear center of the movable inner rail 418 utilizing the fact that the shear center never fails to be located to be at the backside (the side opposite to the one which the C-shaped cross-section is opened) in case of a structure with a C-shaped or U-shaped cross-section.

More specifically, by adjusting the thickness of the protruding flange portion 63 provided on the positioning collar 64 in case of the rear link 462 at the inner side, and by adjusting the thickness of the protruding flange portion 62 provided on the link pin 50 in case of the front link 460 and the rear link 462 at the outer side, so as to adjust the relative positional relationship in the widthwise direction between the movable inner rail 418 and the front link 460 or the rear link 462 in such a way that the shear load transmitted from the front link 460 or the rear link 462 passes through the shear center located to be at the inner side in the widthwise direction of the side surface portion of the movable inner rail 418, when the movable inner rail 418 is brought into an overhanging situation due to a case where the cushion seat is positioned to be in the most frontward position, so that the front end of the movable inner rail 418 protrudes forward from the front end of the stationary outer rail 416, or a case where the cushion seat is positioned to be in the most rearward position, so that the rear end of the movable inner rail 418 protrudes rearward from the rear end of the stationary outer rail 416, the generation of the torsional moment on the movable inner rail 418 can be restricted, even if the shear load is exerted on the movable inner rail 418 via the front link 460 or the rear link 462, whereby the generation of the locking of the slide in the longitudinal direction of the movable inner rail 418 relative to the stationary outer rail 416 can be restricted, so much so that the generation of a strange sound or noise can be prevented when the movable inner rail 418 is forcibly slid relative to the stationary outer rail 416, and as a result, the smooth slide function can be always secured, no matter in which longitudinal position the movable inner rail 418 is located relative to the stationary outer rail 416.

In this connection, the above smooth slide function can be always secured only by mounting such a positioning means on the conventional slide structure without a need to modify the conventional slide structure in a big way.

According to the present invention, the torsion generated on the movable rail can be restricted, and thus, the smooth sliding function of the movable rail relative to the stationary rail can be secured by adjusting the positional relationship between a parallelogram link mechanism and the movable rail in the widthwise direction of the vehicle in such a way that the shear load acting on the movable rail with a C-shaped cross-section through a link of the parallelogram link mechanism passes through the shear center of the movable rail utilizing the fact that the shear center never fails to be located to be at the backside (the side opposite to the one which the C-shaped cross-section is opened) in case of a structure with a C-shaped or U-shaped cross-section, so that the present invention is advantageously applicable to an automobile industry.

A second embodiment of the present invention will be described with reference to the drawings. In the following description, with respect to the same elements as those in the first embodiment, an explanation thereabout is omitted by attaching the same reference numbers to those elements, and the technical feature of this embodiment will be described in detail.

The technical feature of this embodiment lies in the fact that the stationary and the movable rails are disposed to be at the inner and the outer sides in the widthwise direction, respectively, whereas, in the first embodiment, the stationary and the movable rails are disposed to be at the outer and the inner sides in the widthwise direction, respectively.

In this connection, in this embodiment, the positioning collar 64 is adopted for adjusting the widthwise position between the movable outer rail and the lifter link.

Figure 18:
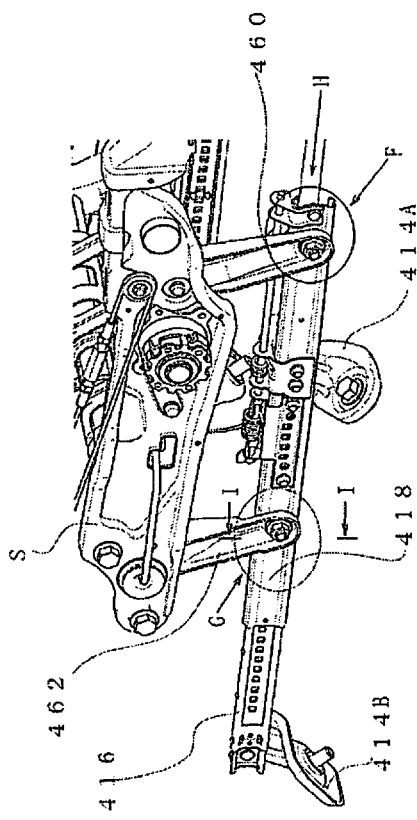
FIG. 18 is a partial perspective view showing the slide structure of a vehicle seat of a second embodiment of the present invention.
Figure 20:
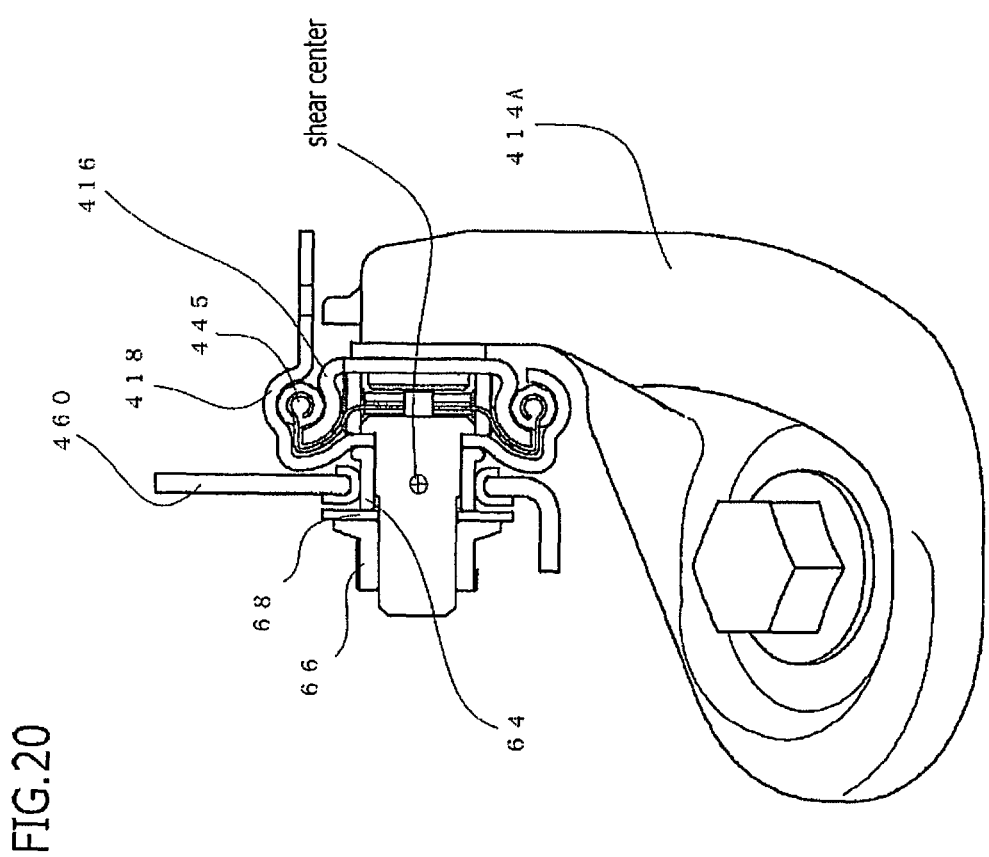
FIG. 20 is a view seen from H-direction in FIG. 18.
Figure 22:
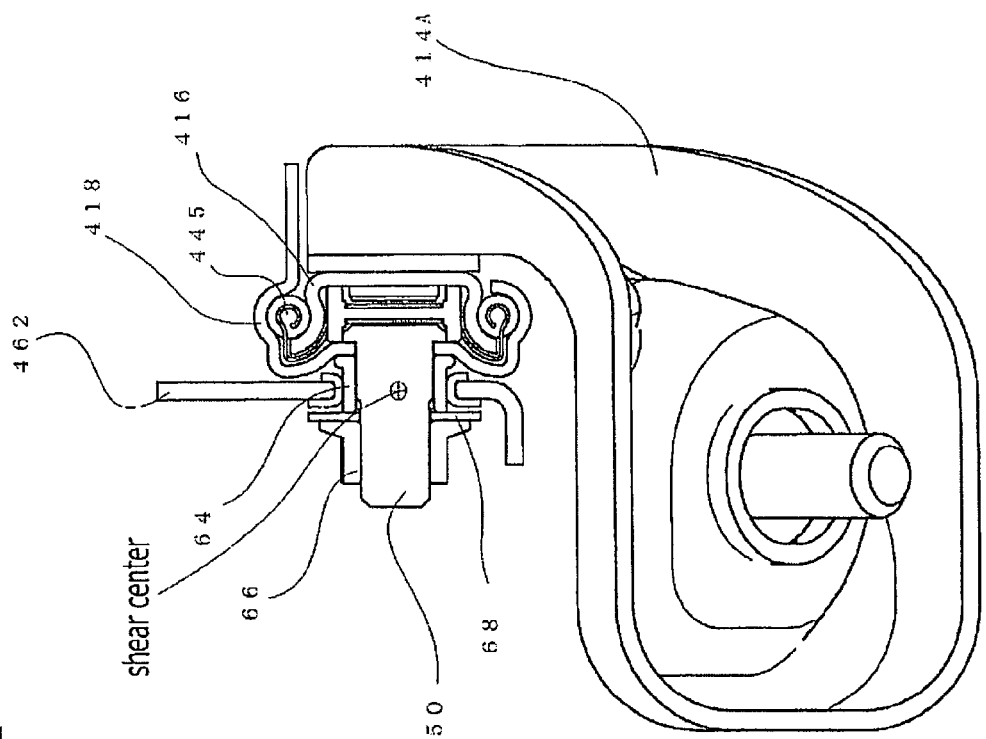
FIG. 22 is a cross-sectional view taken along a line I-I in FIG. 18.
Figure 23:
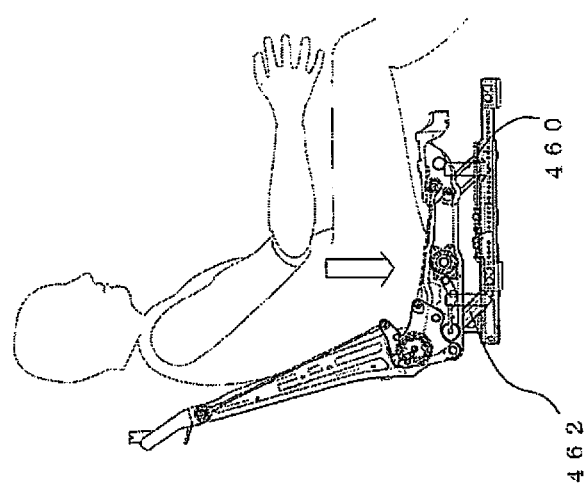
FIG. 23 is a view showing a situation in which a shear load is generated due to a weight of a passenger in a conventional slide structure of a vehicle seat.
Figure 24:
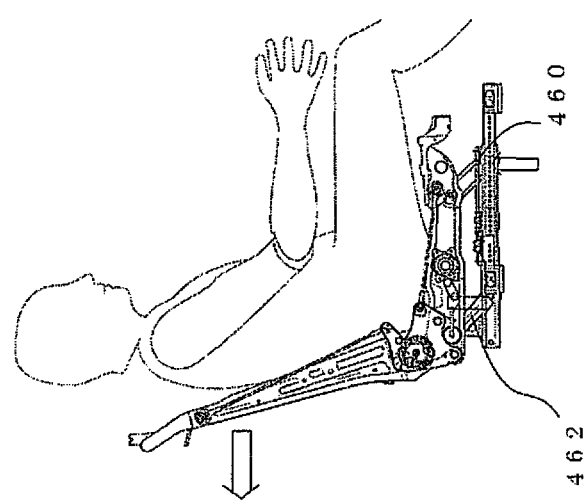
FIG. 24 is a view showing a situation in which a shear load is generated in a case where a vehicle is collided from behind in a conventional slide structure of a vehicle seat.
Figure 25:
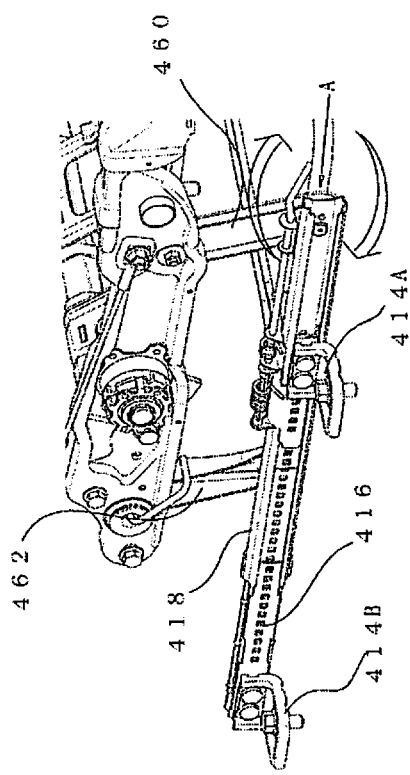
FIG. 25 is a view showing a situation in which a torsional moment is generated in FIGS. 23 and 24.
Figure 26:
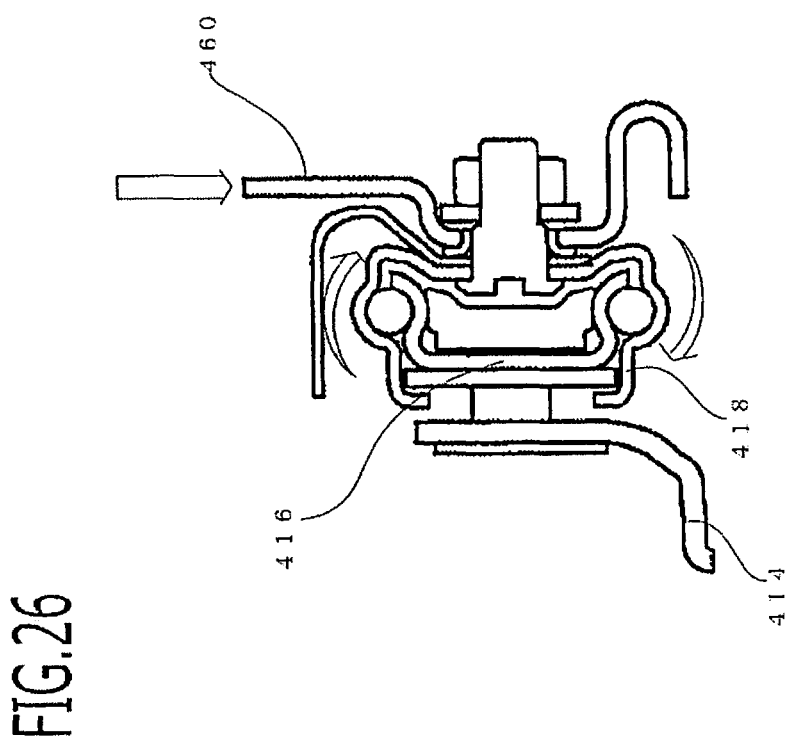
FIG. 26 is a view seen from A-direction in FIG. 25.

More specifically, as shown in FIGS. 18, 20 and 22 (the left side indicates the inner side in the widthwise direction in these Figs.), the stationary rail extends in the longitudinal direction of the vehicle, and includes a substantially C-shaped cross-section and is disposed in such a way that the C-shaped cross-section is oriented to be elongated in the vertical direction, while, on the other hand, the movable rail extends in the longitudinal direction of the vehicle, and fits over the stationary rail so as to be slid in the longitudinal direction relative to the stationary rail, and is fixed to the cushion seat, and includes a substantially C-shaped cross-section, and is disposed in such a way that the C-shaped cross-section is oriented to be elongated in the vertical direction. This embodiment is the same as the first embodiment in that the movable rail fits with the stationary rail in such a way that the respective open portions formed by the respective C-shaped cross-sections are opposed to each other. However, this embodiment is different from the first embodiment in that the stationary rail is disposed to be inward in the widthwise direction relative to the movable rail in such a way that the open portion of the C-shaped cross-section of the stationary rail is oriented to be outward in the widthwise direction, while the movable rail is disposed to be outward in the widthwise direction relative to the stationary rail in such a way that the open portion of the C-shaped cross-section of the movable rail is oriented to be inward in the widthwise direction.

As shown in FIG. 18, at the outer side, the front link 460 and the rear link 462 are connected to the movable side surface 430 of the movable outer rail 418 from outside, while, the stationary inner rail 416 is fixed to, and thus, supported from the vehicle floor by the front leg 414A and the rear leg 414B from inside.

Figure 19:
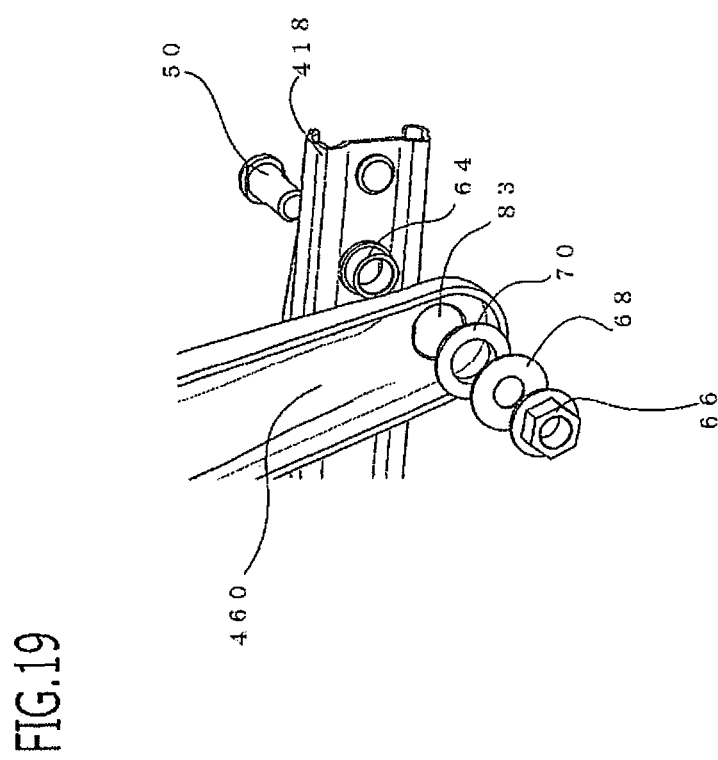
FIG. 19 is a view showing elements around F portion of FIG. 18.

In this case, as shown in FIG. 19 (the left side indicates the inner side in the widthwise direction in this Fig.), since the front link 460 can be connected by screwing the nut 66 from outside, the connection of the front link 460 can be easily carried out, as compared with the first embodiment.

As shown in FIG. 19, like the first embodiment, the front link 460 at the outer side is pinned to the movable outer rail 418 via the link pin 50, and is connected to the link pin 50 by the nut 66 via the driving bush 70 and the washer 68 so as to be rotatable about the link pin 50.

As shown in FIG. 20, unlike the first embodiment, the shear center of the movable outer rail 418 is situated to be outward in the widthwise direction relative to the side surface of the movable outer rail 418, however, the relative positional relationship in the widthwise direction between the movable outer rail 418 and the front link 460 is adjusted in such a way that the shear load transmitted from the front link 460 passes through the shear center by using the positioning collar 64, as was the case of the rear link 462 at the inner side in the first embodiment.

More specifically, the above relative positional relationship is adjusted by adjusting the thickness of the protruding flange provided on the peripheral surface of the positioning collar 64.

Figure 21:
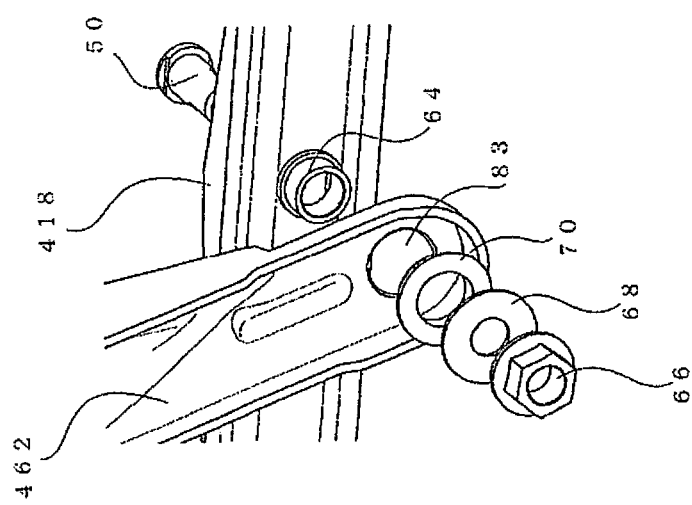
FIG. 21 is a view showing elements around G portion of FIG. 18.

As shown in FIGS. 21 and 22 illustrating the elements of the rear link 462 at the outer side and the cross-section of the rear link 462, the relative positional relationship in the widthwise direction between the movable outer rail 418 and the rear link 462 is adjusted by adjusting the thickness of the protruding flange portion 63 provided on the peripheral surface of the positioning collar 64, in the same fashion as the front link 460 at the outer side.

In this connection, the above technical matters with respect to the front link 460 and the rear link 462 at the outer side are applicable to the front link 460 and the rear link 462 at the inner side.

As described above, the preferred embodiments of the present invention were described in detail, however, it is evident that those skilled in the art could modify or change the embodiments in various manners without departing from the scope of the present invention.

For instance, in the first embodiment, the sliding structure is applied to the automobile, however, the sliding structure in the first embodiment may be applied to general transportation vehicles such as railway vehicles, ships, airplanes, roller coasters in a park, etc.

Further, in the second embodiment, the positioning collar 64 was adopted as a means for adjusting the position in the widthwise direction between the movable outer rail 418 and the lifter link, however, the positioning collar 64 may be omitted by providing a protruding flange on the peripheral surface of the link pin 50 to weld the link pin 50 to the movable outer rail 418, with respect to the front link at the inner side, and the front and rear links at the outer side, although the positioning collar 64 is necessary with respect to the rear link at the inner side due to the fact that the reinforcing bracket 51 is required for reinforcing the movable outer rail 418 because of the provision of the belt anchor.

What is claimed is:

1. A slide structure of a seat for a vehicle which positions a cushion seat in the longitudinal direction of the vehicle, comprising:
    a stationary outer rail which extends in the longitudinal direction of the vehicle and includes a substantially C-shaped cross-section an open portion of which is oriented to be inward in the widthwise direction, and is disposed in such a way that its cross-section is elongated in the vertical direction,
    a movable inner rail which extends in the longitudinal direction of the vehicle and fits over the stationary outer rail so as to be slid relative to the stationary outer rail in the longitudinal direction and is fixed on the cushion seat and includes a substantially C-shaped cross-section an open portion of which is oriented to be outward in the widthwise direction, and is disposed in such a way that its side surface is elongated in the vertical direction, whereby the movable inner rail fits with the stationary outer rail in such a way that open portions formed by the respective C-shaped cross-sections are opposed to each other, so that in a case where the cushion seat is located to be in a most frontward position, a front end of the movable inner rail protrudes forward from the front end of the stationary outer rail, while, in a case where the cushion seat is located to be in a most rearward position, a rear end of the movable inner rail protrudes rearward from the rear end of the stationary outer rail,
    said slide structure further comprises a parallelogram link mechanism rotatable about a horizontal axis including a front link and a rear link parallel to each other, one end of each of which is pinned to the cushion seat, while the other end of each of which is pinned to the side surface of the movable inner rail, and
    a means for adjusting the widthwise position which functions to adjust the relative positional relationship in the widthwise direction between the movable inner rail and the front link or the rear link in such a way that a shear load transmitted from the front link or the rear link passes through a shear center situated to be inward in the widthwise direction of the side surface of the movable inner rail.

2. The slide structure of the seat for the vehicle according to claim 1, wherein said slide structure further comprises link pins, each of which pins the respective front and rear links to a side surface portion of the movable inner rail, each of the link pins includes a body portion with a non-circular cross-section and a reduced-diameter threaded portion with a circular cross-section on a circumferential surface of which a threaded portion is provided, a shoulder portion is formed between the body portion and the threaded portion, a non-circular opening into which the body portion penetrates is provided on the side surface of the movable inner rail in such a way that the link pin cannot rotate about the axial direction of the link pin, a means for positioning in the widthwise direction includes a protruding flange on the circumferential surface of the link pin, one surface of the protruding flange abuts against the side surface of the movable inner rail and a surface of the protruding flange opposite to the one surface abuts against a fork lift and the protruding flange includes a predetermined thickness in such a way that the shear load transmitted from the front link or the rear link passes through the shear center of the movable inner rail, and a circular opening into which the body portion can penetrate is provided on the front link or the rear link.

3. The slide structure of the seat for the vehicle according to claim 1, wherein said slide structure further comprises link pins, each of which pins the respective front and rear links to a side surface portion of the movable inner rail, each of the link pins includes a body portion with a non-circular cross-section, a flange portion is provided on one end of the body portion and a reduced-diameter threaded portion with a circular cross-section on a circumferential surface of which a threaded portion is provided is provided on the other end of the body portion, a shoulder portion is formed between the body portion and the threaded portion, an non-circular opening into which the body portion penetrates is provided on the side surface of the movable inner rail in such a way that the link pin cannot rotate about the axial direction of the link pin, a means for positioning in the widthwise direction includes a positioning collar including on its peripheral surface a protruding flange, one surface of which abuts against the side surface of the movable inner rail and a surface opposite to the one surface abuts against a fork lift and which includes a predetermined thickness in such a way that the shear load transmitted from the front link or the rear link passes through the shear center of the movable inner rail, the positioning collar includes a perforated hole with a non-circular cross-section which can fit over the outer peripheral surface of the body portion of the link pin and an outer circumferential surface with a circular cross-section, and a circular opening into which the body portion can penetrate is provided on the front link or the rear link.

4. The slide structure of the seat for the vehicle according to claim 2 further comprises a nut threaded into the threaded portion and a washer including an opening into which the threaded portion can penetrate, whereby the one surface of the washer is brought into abutment with the side surface of the front link or the rear link by making the threaded portion penetrate into the washer and screwing the nut, and the front link or the rear link is fixed in the widthwise direction relative to the movable inner rail by pressing the front link or the rear link against the movable inner rail.

5. The slide structure of the seat for the vehicle according to claim 3, wherein the positioning collar includes a fitting portion to be fitted with the non-circular opening of the movable inner rail on the one surface of the protruding flange, and the axial length of the positioning collar is the same as that of the body portion, whereby the end surface of the positioning collar is pressed to be fixed by the washer.

6. The slide structure of the seat for the vehicle according to claim 2, wherein a driving bush is interposed between the protruding flange and the front link or the rear link.

7. The slide structure of the seat for the vehicle according to claim 2, wherein the stationary outer rail includes a stationary side surface oriented to be in the vertical direction, a stationary protruding upper surface protruding inward in the widthwise direction from the upper edge of the stationary side surface, and a stationary protruding lower surface protruding inward in the widthwise direction from the lower edge of the stationary side surface, the side surface of the movable inner rail is movable and oriented to be in the vertical direction, a movable protruding upper surface protruding outward in the widthwise direction from the upper edge of the movable side surface, and a movable protruding lower surface protruding outward in the widthwise direction from the lower edge of the movable side surface.

8. A slide structure of a seat for a vehicle which positions a cushion seat in the longitudinal direction of the vehicle comprises a stationary inner rail which extends in the longitudinal direction of the vehicle and includes a substantially C-shaped cross-section an open portion of which is oriented to be inward in the widthwise direction, and is disposed in such a way that its cross-section is elongated in the vertical direction, a movable outer rail which extends in the longitudinal direction of the vehicle and fits over the stationary inner rail so as to be slid relative to the stationary inner rail in the longitudinal direction and is fixed on the cushion seat and includes a substantially C-shaped cross-section, and is disposed in such a way that its side surface is elongated in the vertical direction, whereby the movable outer rail fits with the stationary inner rail in such a way that open portions formed by the respective C-shaped cross-sections are opposed to each other, so that in a case where the cushion seat is located to be in a most frontward position, a front end of the movable outer rail protrudes forward from the front end of the stationary inner rail, while, in a case where the cushion seat is located to be in a most rearward position, a rear end of the movable outer rail protrudes rearward from the rear end of the stationary inner rail, said slide structure further comprises a parallelogram link mechanism rotatable about a horizontal axis including a front link and a rear link parallel to each other, one end of each of which is pinned to the cushion seat, while the other end of each of which is pinned to the side surface of the movable outer rail, and a means for adjusting the widthwise position which functions to adjust the relative positional relationship in the widthwise direction between the movable outer rail and the front link or the rear link in such a way that a shear load transmitted from the front link or the rear link passes through a shear center situated to be outward in the widthwise direction of the side surface of the movable outer rail.

9. The slide structure of the seat for the vehicle according to claim 8, wherein said slide structure further comprises link pins, each of which pins the respective front and rear links to a side surface portion of the movable inner rail, each of the link pins includes a body portion with a non-circular cross-section and a reduced-diameter threaded portion with a circular cross-section on a circumferential surface of which a threaded portion is provided, a shoulder portion is formed between the body portion and the threaded portion, a non-circular opening into which the body portion penetrates is provided on the side surface of the movable inner rail in such a way that the link pin cannot rotate about the axial direction of the link pin, a means for positioning in the widthwise direction includes a protruding flange on the circumferential surface of the link pin, one surface of the protruding flange abuts against the side surface of the movable inner rail and a surface of the protruding flange opposite to the one surface abuts against a fork lift and which protruding flange includes a predetermined thickness in such a way that the shear load transmitted from the front link or the rear link passes through the shear center of the movable inner rail, and a circular opening into which the body portion can penetrate is provided on the front link or the rear link.

10. The slide structure of the seat for the vehicle according to claim 8, wherein said slide structure further comprises link pins each of which pins the respective front and rear links to a side surface portion of the movable inner rail, each of the link pins includes a body portion with a non-circular cross-section, a flange portion is provided on one end of the body portion and a reduced-diameter threaded portion with a circular cross-section on a circumferential surface of which a threaded portion is provided is provided on the other end of the body portion, a shoulder portion is formed between the body portion and the threaded portion, an non-circular opening into which the body portion penetrates is provided on the side surface of the movable inner rail in such a way that the link pin cannot rotate about the axial direction of the link pin, the means for positioning in the widthwise direction includes a positioning collar including on its peripheral surface a protruding flange, one surface of which abuts against the side surface of the movable inner rail and a surface opposite to the one surface abuts against a fork lift and which includes a predetermined thickness in such a way that the shear load transmitted from the front link or the rear link passes through the shear center of the movable inner rail, the positioning collar includes a perforated hole with a non-circular cross-section which can fit over the outer peripheral surface of the body portion of the link pin and an outer circumferential surface with a circular cross-section, and a circular opening into which the body portion can penetrate is provided on the front link or the rear link.

* * * * *